(12) United States Patent
Fletcher

(10) Patent No.: US 10,032,373 B2
(45) Date of Patent: Jul. 24, 2018

(54) SYSTEMS AND METHODS FOR USING AUTONOMOUS VEHICLES IN TRAFFIC

(71) Applicant: Cubic Corporation, San Diego, CA (US)

(72) Inventor: Graham Fletcher, Stanford in the Vale (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/720,219

(22) Filed: Sep. 29, 2017

(65) Prior Publication Data

US 2018/0090001 A1    Mar. 29, 2018

Related U.S. Application Data

(60) Provisional application No. 62/401,668, filed on Sep. 29, 2016, provisional application No. 62/401,679, (Continued)

(51) Int. Cl.
*G05D 1/02* (2006.01)
*G08G 1/0965* (2006.01)
(Continued)

(52) U.S. Cl.
CPC ........... *G08G 1/0965* (2013.01); *B60W 20/12* (2016.01); *B60W 30/18154* (2013.01); (Continued)

(58) Field of Classification Search
CPC .................... B60W 2750/40; H04L 51/20
See application file for complete search history.

(56) References Cited

U.S. PATENT DOCUMENTS 9,278,689 B1 *   3/2016  Delp ............... B60W 30/00
2009/0174572 A1   7/2009  Smith
(Continued)

FOREIGN PATENT DOCUMENTS

DE    102011102024 A1 *  4/2012  ........... B60W 30/09
WO    WO-2016126317 A1 *  8/2016
WO    WO-2017148531 A1 *  8/2017

OTHER PUBLICATIONS

Invitation to Pay Additional Fees and Partial Search Report dated Mar. 20, 2018 for PCT/US2017/054311; all pages.

*Primary Examiner* — Thomas G Black
*Assistant Examiner* — Ce Li Li
(74) *Attorney, Agent, or Firm* — Kilpatrick Townsend & Stockton

(57) ABSTRACT

An autonomous vehicle includes a vehicle body, a drive mechanism configured to propel the vehicle body, a location module, a communication interface in communication with a traffic control system, and a processing unit in communication with the drive mechanism, the location module, and the communication interface. The processing unit is configured to receive, via the communication interface, a route of a prioritized vehicle and determine, in conjunction with the location module, whether a route of the autonomous vehicle intersects the route of the prioritized vehicle. The processing unit is configured to adjust, using the drive mechanism, one or more of a direction or a speed of the autonomous vehicle based on the determination.

17 Claims, 8 Drawing Sheets

Related U.S. Application Data filed on Sep. 29, 2016, provisional application No. 62/401,683, filed on Sep. 29, 2016.

(51) Int. Cl.
  *G08G 1/0967* (2006.01)
  *B60W 20/12* (2016.01)
  *B60W 30/18* (2012.01)

(52) U.S. Cl.
  CPC ... *G08G 1/096725* (2013.01); *B60W 2550/20* (2013.01); *B60W 2720/10* (2013.01)

(56) References Cited

U.S. PATENT DOCUMENTS

| | | |
|---|---|---|
| 2011/0018736 A1 | 1/2011 | Carr |
| 2015/0100189 A1 | 4/2015 | Tellis et al. |
| 2015/0149019 A1 | 5/2015 | Pilutti et al. |
| 2016/0035223 A1* | 2/2016 | Gutmann .............. B60W 30/09 340/907 |
| 2016/0148513 A1* | 5/2016 | Beaurepaire ........... G08G 1/164 701/117 |
| 2016/0189435 A1* | 6/2016 | Beaurepaire ........... G05D 1/021 705/13 |
| 2016/0231746 A1 | 8/2016 | Hazelton et al. |
| 2016/0267796 A1* | 9/2016 | Hiroma .................... G08G 1/22 |
| 2017/0057514 A1* | 3/2017 | Toyoda ........... B60W 30/18154 |
| 2017/0192429 A1* | 7/2017 | Tseng .................. G05D 1/0088 |

* cited by examiner

SYSTEMS AND METHODS FOR USING AUTONOMOUS VEHICLES IN TRAFFIC

CROSS-REFERENCES TO RELATED APPLICATIONS

This Application claims priority to U.S. Provisional Patent Application No. 62/401,668, filed Sep. 29, 2016, entitled "USING AUTONOMOUS VEHICLES TO PRIORITIZE BLUE LIGHT VEHICLES", U.S. Provisional Patent Application No. 62/401,679, filed Sep. 29, 2016, entitled "USING AUTONOMOUS VEHICLES TO DISSIPATE SHOCK WAVES IN TRAFFIC FLOWS", and U.S. Provisional Patent Application No. 62/401,683, filed Sep. 29, 2016, entitled "USING AUTONOMOUS VEHICLES TO CONTROL TRAFFIC SPEED", the entire disclosures of which are hereby incorporated by reference, for all purposes, as if fully set forth herein.

BACKGROUND OF THE INVENTION

Conventional traffic control systems utilizes various actuators, such as dynamic speed limits, traffic light timings, and warning or other information signs. The traffic control system staff decides what effect they want to create within a particular area and then use one or more of these actuators to changes the travel patterns within the area. For example, this may include changing traffic signal timing to increase capacity on one road while reducing it on another. Conventional methods of traffic control present several problems. For example, dynamic speed limits have significant costs associated with enforcement, and are generally disregarded by the traveling population without active enforcement. Traffic signal timing allows congestion to be moved around a city and effective method currently used, however, its applications are limited. Information signs, such as signs that instruct drivers to slow due to children being present, are known to have different impacts, with different proportions of drivers obeying each type of sign on a particular route. For example, traffic control offices routinely pick a message to have its known impact. As just one example, traffic control system may utilize a "Queue Ahead" sign, a "severe congestion n ahead" sign, and/or a "road closed" sign based on a known percentage of drivers seek an alternate route based on seeing such a sign (known effectiveness rate).

Additionally, the shockwave phenomena in traffic flows is a well understood issue. When one person brakes (e.g., slows down his or her car), the person behind has to brake a little harder due to a delay caused by reflex time. These delays add up and are compounded until either a phantom traffic jam is created or the shockwave dissipates due to a large gap in the traffic. These shockwaves can cause traffic delays that last for hours. Currently, the only way to combat these is to send out police or other municipal and/or prioritized vehicles in the middle and/or end of the traffic jam to interrupt traffic flow and create a rolling roadblock. Such solutions are very expensive and divert police and other resources away from more important tasks.

BRIEF SUMMARY OF THE INVENTION

Embodiments of the present invention are generally related to using Autonomous vehicles to control traffic. Autonomous vehicles may be used to provide a low-cost, efficient solution for many traffic issues, such as congestion, shockwave dissipation, air quality issues, detours, and the like. The autonomous vehicles may be controlled remotely and/or may communicate with other vehicles and/or systems to determine how to best manage traffic solutions.

In one aspect, an autonomous vehicle is provided. The autonomous vehicle may include a vehicle body, a drive mechanism configured to propel the vehicle body, a location module, a communication interface in communication with a traffic control system, and a processing unit in communication with the drive mechanism, the location module, and the communication interface. The processing unit may be configured to receive, via the communication interface, a route of a prioritized vehicle, determine, in conjunction with the location module, whether a route of the autonomous vehicle intersects the route of the prioritized vehicle, and adjust, using the drive mechanism, one or more of a direction or a speed of the autonomous vehicle based on the determination.

In another aspect, a method for manipulating traffic using an autonomous vehicle is provided. The method may include receiving, at the autonomous vehicle, a route of a prioritized vehicle, determining by the autonomous vehicle whether a route of the autonomous vehicle intersects the route of the prioritized vehicle, and adjusting one or more of a direction or a speed of the autonomous vehicle based on the determination.

In another aspect, a non-transitory computer-readable medium having instructions embedded thereon for manipulating traffic using an autonomous vehicle is provided. The instructions may include computer code for causing a computing device to receive, at an autonomous vehicle, a route of a prioritized vehicle, determine by the autonomous vehicle whether a route of the autonomous vehicle intersects the route of the prioritized vehicle, and adjust one or more of a direction or a speed of the autonomous vehicle based on the determination.

In another aspect, a method of controlling traffic using autonomous vehicles is provided. The method may include receiving information related to a traffic condition. The information may include a location and an indication of a type of the traffic condition. The method may also include determining that automated traffic control is needed based on the received information and adjusting one or both of a speed or a direction of at least one autonomous vehicle based on the determination.

In another embodiment, a system for manipulating traffic using an autonomous vehicle is provided. The system may include a communications interface in communication with at least one autonomous vehicle, a processing unit, and a memory configured to store instructions that cause the processing unit to receive information related to a traffic condition. The information may include a location and an indication of a type of the traffic condition. The instructions may also cause the processing unit to determine that automated traffic control is needed based on the received information and adjust one or both of a speed or a direction of at least one autonomous vehicle based on the determination.

In another aspect, a non-transitory computer-readable medium having instructions embedded thereon for manipulating traffic using an autonomous vehicle is provided. The instructions may include computer code for causing a computing device to receive information related to a traffic condition. The information may include a location and an indication of a type of the traffic condition. The instructions may also include computer code for causing the computing device to determine that automated traffic control is needed based on the received information and adjust one or both of a speed or a direction of at least one autonomous vehicle based on the determination.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
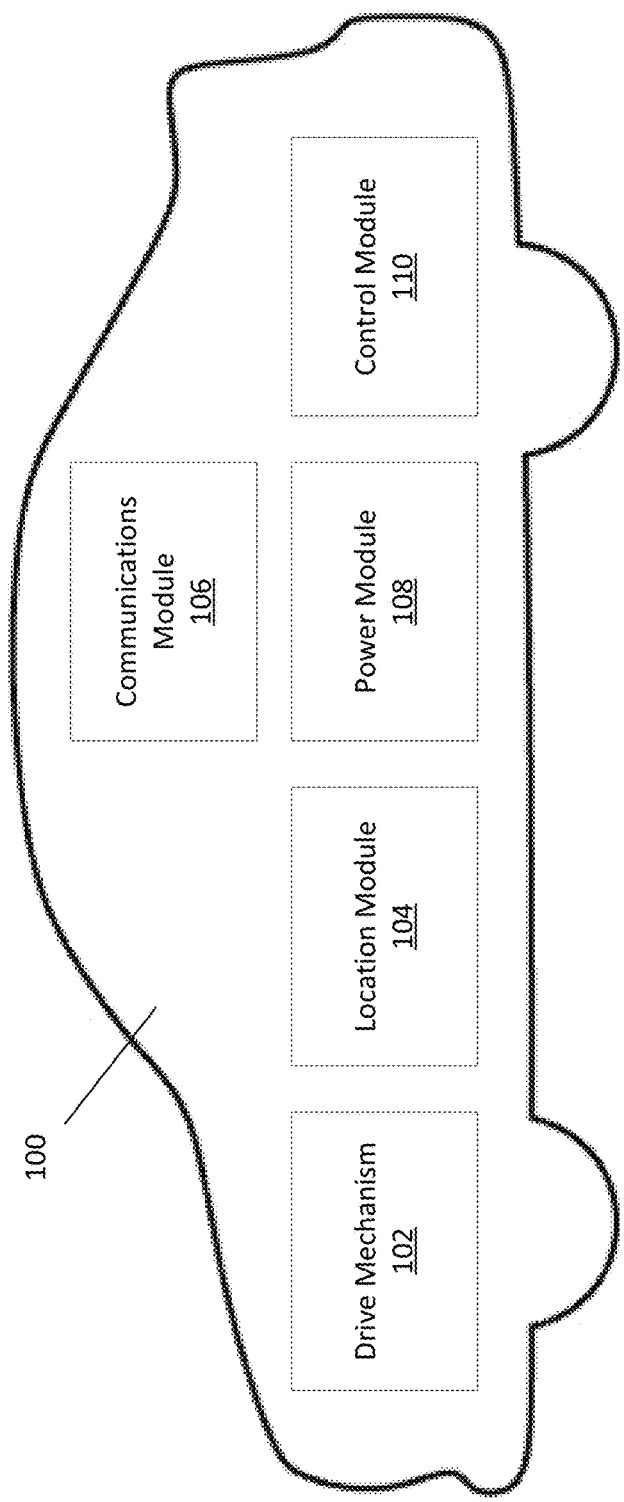
FIG. 1 depicts a system diagram of an autonomous vehicle according to embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention provide systems and methods for controlling traffic flow using autonomous vehicles. In some embodiments, traffic control systems provide prioritization to blue light vehicles and/or other vehicle types by controlling traffic density using autonomous vehicles. For example, autonomous vehicles may be controlled to increase and/or decrease travel speeds, and/or otherwise manipulate traffic flows to adjust the density of vehicles on a roadway. According to techniques described herein, autonomous vehicles that are present in a traffic stream may be used to manipulate the general traffic density on the path of a blue light vehicle. Lowering the traffic density will generally increase the speed of the blue light vehicle. For example, a blue light control system may notify a city control and/or other traffic control system an expected path of a blue light vehicle. The city control may then send this information to autonomous vehicles in the area of the blue light vehicle. The alert may be sent to the autonomous vehicles using one or more wireless communication mechanisms, including cellular, and/or other wireless protocols. Depending on the technology used, different standards and/or protocols may apply. Autonomous vehicles that are expecting to cross the path in front of the blue light vehicle can slow early and gently so that they pass, for example, behind the blue light vehicle. This causes traffic behind the autonomous vehicles to slow down gently as well, allowing the blue light vehicle to pass the path of the autonomous vehicles without interruption. In some embodiments, this crossing may be up to 5 minutes in front of the blue light vehicle, although in other embodiments the crossing may be shorter or longer. In some embodiments, the slowing may be about 10% of the autonomous vehicle speed, while in other embodiments the amount of slowing may be greater or less than 10%. The slowing can be calculated (e.g., based on autonomous vehicle speed and/or distance from a blue light vehicle) such that it passes behind the blue light vehicle. The slowing of autonomous vehicle traffic in this manner can reduce the number of manual cars in front of the blue light vehicle. Slowing may be done in a smooth and/or gradual manner, which may result in deceleration at a constant and/or variable rate, such as between about 3-5 mph/second or less.

The techniques described herein can provide numerous advantages. In contrast to attempting to create a green wave (which can be very difficult and tends to create traffic jams on crossing roads), lowering traffic density in the manner described herein allows the blue light vehicle to maneuver. Furthermore, in some jurisdictions, blue light vehicles may not be bound by traffic signals, so it may not be necessary to create a green wave. Furthermore, a zone of lower traffic density can cause lower propagating traffic issues on cross roads. As such, embodiments, may additionally and/or alternatively employ using light timings, speed limits, and/or other traffic intervention methods to create a zone of lower density.

Embodiments of the invention also provide the ability for a city traffic control system to manipulate traffic flows using autonomous vehicles. This allows the traffic control systems to further decrease congestion, improve reactions to events or incidents, improve air quality, and/or reduce the economic impact of travel. For example, a fleet of autonomous vehicles may be used to create a traffic control actuator that controls the speed of manual vehicles. This creates an ability to control speed on the road in a much more dynamic way and with finer control than with conventional traffic actuators. Once autonomous vehicles are active in a city and represent a significant proportion of the road usage, it will be normal for them to be present on most roads. If these vehicles autonomous vehicles at 25 mph then so will other vehicles. If the autonomous vehicles travel at 10 mph then other vehicles will too. This is because in most cities and other traffic areas, road space limits the ability of vehicles to overtake slower moving vehicles. This gives the city traffic control system the ability to set the speed of traffic on any road. It may be possible to control traffic flows in a municipal area with approximately 30% of all vehicles being autonomous vehicles, although larger or smaller percentages may be used depending on the road structures in a particular area.

Embodiments of the present invention may use autonomous vehicles to reduce the size of shockwaves and eventually removing traffic jams. For example, one or more autonomous vehicles in a traffic stream identifies a pattern of braking and then accelerating. The propagation of the pattern is confirmed by later autonomous vehicles. An autonomous vehicle approaching the shockwave can brake early, but gently to a lower velocity. This can cause vehicles behind the braking autonomous vehicle to slow smoothly. Ultimately, by the time the autonomous vehicle reaches the shockwave, the size of the shockwave may be reduced. Subsequent autonomous vehicles in the traffic stream can repeat this procedure until the shockwave is gone. It will be noted that autonomous vehicles may communicate with each other and/or other vehicles using any of a variety of technologies (e.g., cellular, Wi-Fi, and/or other commercial or proprietary techniques). Moreover, autonomous vehicles may communicate directly with one another and/or via a central system or hub. Sensors (such as accelerometers, speed monitors, braking monitors, and the like) on each of the autonomous vehicles may be used to monitor acceleration and braking to determine if a shockwave is present. An automation system of an autonomous vehicle may be used to provide the smooth slowing in the techniques described above. GPS and/or terrestrial positioning techniques (e.g., using radiofrequency (RF) signals) may be utilized to allow a traffic control system and/or autonomous vehicles to monitor the location of a shockwave, to enable an autonomous vehicle approaching the shockwave to brake in the manner described above. The techniques described herein may provide a number of benefits. For example, the use of autonomous vehicles may provide for a reduction in manpower required to reduce shockwave in traffic. Additionally or alternatively, autonomous vehicles may provide the ability to react to smaller shockwave before they grow and cause significant congestion.

It will be noted that the autonomous vehicles may include any of a variety of vehicles that may be controllable or partially controllable to effectuate the techniques descried herein. Accordingly, autonomous vehicles may refer to self-driving vehicles, partially-automated vehicles, and/or other vehicle types. Furthermore, in some embodiments, autonomous vehicles may be driven, owned, and/or managed by private citizens, public transportation authorities, commercial fleets, and/or other entities.

Turning now to FIG. 1, a system diagram of one embodiment of an autonomous vehicle 100 is shown. Autonomous vehicle 100 may include a drive mechanism 102, such as a motor, engine, transmission, or other mechanism for putting the autonomous vehicle 100 into motion. It will be appreciated that drive mechanism 102 may be fueled by gasoline, diesel, electricity, hydrogen, natural gas, biofuel, and/or any other suitable energy source. Drive mechanism 102 may also include one or more steering mechanisms, such as a steering wheel, to adjust a heading of the autonomous vehicle 100. Autonomous vehicle 100 may also include a location module 104. Location module 104 may include a location determining device, such as a global positioning satellite (GPS) system that can determine a present location of the autonomous vehicle 100. In some embodiments, the location module 104 may also be able to determine a path or likely path of the autonomous vehicle 100. The path or likely path may be determined by a user entering a destination location into the GPS system, with the location module 104 calculating and providing a travel route to the user and/or the drive mechanism 102 of autonomous vehicle 100. For example, if the autonomous vehicle 100 is in an automated state, the location module 104 may determine a destination location and a path on which to travel to arrive at the destination. The path may be based on a quickest path, which may involve retrieving current and/or historical traffic data to determine a likely quickest path, a path having a shortest distance, a path that avoids highways, toll roads, or specific locations, and/or some combination of the above factors and/or additional criteria. The path may be used to generate a set of directions that may be provided to the drive mechanism to determine a speed and/or direction of travel of the autonomous vehicle 100.

Autonomous vehicle 100 may also include a communications module 106. Communications module 106 may be configured to communicate with external devices using one or more wireless communications protocols. For example, cellular signals such as 3G, 4G, LTE, and/or other cellular data networks may be used in conjunction with communications module 106. Other wireless protocols such as Wi-Fi, Bluetooth, WiMAX, and/or other wireless communications protocols may also be used. Communications module may be used to interface the autonomous vehicle 100 with one or more external devices, such as other autonomous vehicles, a traffic control system, blue light and/or other prioritized vehicles, manually driven vehicles, mobile devices such as laptops, mobile phones, tablet computers, and the like, and/or other electronic devices. This allows autonomous vehicle 100 to send data related to its speed, heading, and/or expected route to other vehicles and systems, as well as receive data, such as traffic information, data from other autonomous vehicles, blue light vehicle information, and/or other data. In some embodiments, the autonomous vehicle 100 may receive one or more commands, such as commands that activate an ignition mechanism of the autonomous vehicle and/or cause the autonomous vehicle 100 to adjust a speed, heading, and/or route.

Autonomous vehicle 100 may also include a power module 108 that includes one or more batteries. Power module 108 may be configured to supply power to the various electronic systems, such as the location module 104, communications module 106, and a control module 110. In some embodiments, such as those where autonomous vehicle 100 is an electric and/or hybrid vehicle, power module 108 may be used to power the drive mechanism 102 of autonomous vehicle 100. In some embodiments, the power module 108 may be configured to supply power to a portion of the autonomous vehicle 100 at all times, even when the vehicle is parked, without an occupant, and/or in an inactivated state. For example, the power module 108 may supply a small amount of power to the communications module 108 and/or the control module 110 that allows the autonomous vehicle 100 to receive a wakeup command from a traffic control system and/or other remote start mechanism. Such a wakeup command may be received using the communications module 106 and may instruct the control module 110 to activate the autonomous vehicle 100, such as by activating an ignition mechanism of the autonomous vehicle 100. This allows a traffic control center to control an autonomous vehicle 100 even when the autonomous vehicle 100 has been parked and turned off Control module 110 may include one or more processing units that are specially programmed to execute very specific software commands that are used to control the communication interface, drive mechanism, the location module, and/or other electronic systems of the autonomous vehicle 100. Control module 110 may be configured to perform a number of functions associated with controlling general traffic flow using autonomous vehicle 100. For example, upon receipt of a command to turn on autonomous vehicle 100, control module 110 may cause an ignition mechanism, such as a starter of the autonomous vehicle 100, to activate, turning the autonomous vehicle 100 on. This allows a traffic control system to utilize vehicles that are not already on the roadway to control traffic. In some embodiments, commands may be received that cause the autonomous vehicle 100 to brake or otherwise decelerate to a lower speed, accelerate, change direction, and/or adjust a route of the autonomous vehicle 100. Such adjustments may cause vehicles traveling behind the autonomous vehicle 100 to make similar, corresponding adjustments, which may alter the speed of traffic flow, traffic density, and/or direction of traffic for any of a number of purposes.

As just one example, the control module 110 may be configured to help clear traffic from a path of a prioritized vehicle. Prioritized vehicles may include blue light vehicles, emergency vehicle, police vehicles, government vehicles, construction vehicles, and/or other vehicles that may or may not be associated with a blue light. When a prioritized vehicle is dispatched, the vehicle and/or a control center for the vehicle may issue an alert to a traffic control system. In some embodiments, the control center may be a traffic control system. The alert may indicate that the prioritized vehicle has been or is about to be dispatched to a specific location, such as the site of an accident or emergency. The alert may include destination location of the prioritized vehicle and/or route information of a route the prioritized vehicle will or is expected to follow. The traffic control system may then determine if there are any autonomous vehicles within a predetermined radius of the destination, current location, and/or route of the prioritized vehicle. The predetermined radius (which may or may not be circular in shape and/or symmetrical and may or may not be constant in size in one or more directions) may be a constant radius for all alerts, may be determined based on a distance the prioritized vehicle must travel, and/or may be based on any other factors. In some embodiments, the radius may extend along an entirety of the route, while in other embodiments, the radius may move along with the prioritized vehicle. In some embodiments, the autonomous vehicle 100 may be selected to receive the route of the prioritized information based on the autonomous vehicle 100 being parked and/or unoccupied, in addition to in or in the alternative to being within the predefined radius. In embodiments where the autonomous vehicle 100 is parked and/or unoccupied, the transmission of the route (and/or a separate transmission) may include an activation command that causes the autonomous vehicle 100 to move onto a roadway and/or into traffic. In some embodiments, the autonomous vehicle 100 may be powered off (except for the communications interface 104 and/or the control module 110) and the activation command may cause the autonomous vehicle 100 to activate an ignition mechanism of the autonomous vehicle 100 to turn on an engine, motor, and/or other component of the drive mechanism 102.

Once one or more autonomous vehicles have been identified, the traffic control center may send the route of the prioritized vehicle to the identified autonomous vehicles. The autonomous vehicle 100 receives the route of the prioritized vehicle using the communications interface 106. The route of the prioritized vehicle may include a current location of the prioritized vehicle, a current heading of the prioritized vehicle, a current rate of speed of the prioritized vehicle, an average rate of speed of the prioritized vehicle, and/or an expected path of the prioritized vehicle.

The control module 110 and the location module 104 may then use the route of the prioritized vehicle to determine whether a route of the autonomous vehicle 100 intersects the route of the prioritized vehicle. The routes may be considered to intersect when the autonomous vehicle 100 is going to cross a path of the prioritized vehicle, be on a same section of road as the prioritized vehicle, and/or otherwise have a possibility of coming into close proximity (within a number of blocks or miles of the prioritized vehicle) with the prioritized vehicle during transit of the prioritized vehicle. In some embodiments, the route of the autonomous vehicle 100 may be provided by a GPS system of the location module 104, such as when a user of the autonomous vehicle 100 has selected a destination location. In other embodiments, the location module 104 and control module 110 may calculate an estimated path based on the current location, direction, and/or speed of the autonomous vehicle 100, such as based on GPS coordinates provided by the location module 104 and/or other information provided by vehicle sensors, such as accelerometers, velocity sensors, compasses and the like.

In some embodiments, additional information may be used to determine whether the routes will intersect. For example, traffic information related to roadways within the predefined radius of the prioritized vehicle and/or the intersection location may be provided to the autonomous vehicle 100. This traffic information may include current traffic conditions and/or historical traffic data associated with roadways within the predefined radius. The control module 110 may use this information to determine a time and/or distance remaining until the intersection location.

One or more traffic control actions may be identified by the autonomous vehicle 100 based at least in part on the time and/or the distance remaining to the intersection. Traffic control actions may result in a speed and/or direction of the autonomous vehicle 100 being adjusted to manipulate traffic flows. For example, if autonomous vehicle 100 determines that the intersection will result in crossing in front of the path of the prioritized vehicle and that the crossing will happen within a short period of time (such as within 30 seconds) the autonomous vehicle 100 may slow down quickly such that the autonomous vehicle 100 will now cross the path of the prioritized vehicle after the prioritized vehicle passes the intersection location. The slowing of autonomous vehicle 100 also results in the slowing of traffic behind the autonomous vehicle 100, ensuring that less or no traffic on the route of autonomous vehicle 100 will intersect the route of the prioritized vehicle prior to the prioritized vehicle passing the point of the intersection. If the time and/or distance to the intersection are longer, the autonomous vehicle 100 may determine that no slowing and/or less slowing of the autonomous vehicle is needed. As another example, the autonomous vehicle 100 may determine that the intersection will result in the autonomous vehicle 100 being on the same path and the same heading as the prioritized vehicle ahead of the prioritized vehicle. The autonomous vehicle 100 may determine that a traffic control action of speeding up is necessary to speed up and clear out traffic in front of the prioritized vehicle. For example, if the roadway in front of the autonomous vehicle 100 is generally clear, the autonomous vehicle 100 may speed up, allowing traffic behind the autonomous vehicle 100 to speed up. This helps create and/or maintain a gap between the traffic and the prioritized vehicle.

In some embodiments, updated route information may be provided to the autonomous vehicle 100. For example, the prioritized vehicle may have changed routes and/or may be sped up and/or delayed due to traffic prior to the intersection with the autonomous vehicle 100. The prioritized vehicle may provide updated information to the traffic control center and/or the autonomous vehicle 100 itself. The autonomous vehicle 100 may make further adjustments to its speed, direction, and/or route based on the updated route information. In some embodiments, this updated route information may be received by autonomous vehicle 100 after the autonomous vehicle 100 has already made one or more adjustments to accommodate the prioritized vehicle.

While described with many of the intersection calculations and speed, route, direction commands being controlled by control module 110 of autonomous vehicle 100, it will be appreciated that a central control system, such as the traffic control system, may be able to remotely control a number of autonomous vehicles 100 to accommodate the prioritized vehicle. In such embodiments, the central control system may be a specialized mainframe or other special purpose computer that may be configured to monitor a number of autonomous vehicle locations in real-time using GPS coordinates provided by the autonomous vehicles and/or using traffic beacons, and/or other location sensors. The central control system may then gather traffic data, such as density, speeds, locations of the prioritized vehicle and autonomous vehicle 100 (both on the road and/or parked), and determine how to best manipulate the speeds, routes, and/or directions of the autonomous vehicles 100 to clear a path for the prioritized vehicle. Additionally, it will be appreciated that in some embodiments the prioritized vehicle may directly communicate with the autonomous vehicles to alert the autonomous vehicles that the prioritized vehicle is approaching and/or provide a location of the prioritized vehicle.

Figure 2:
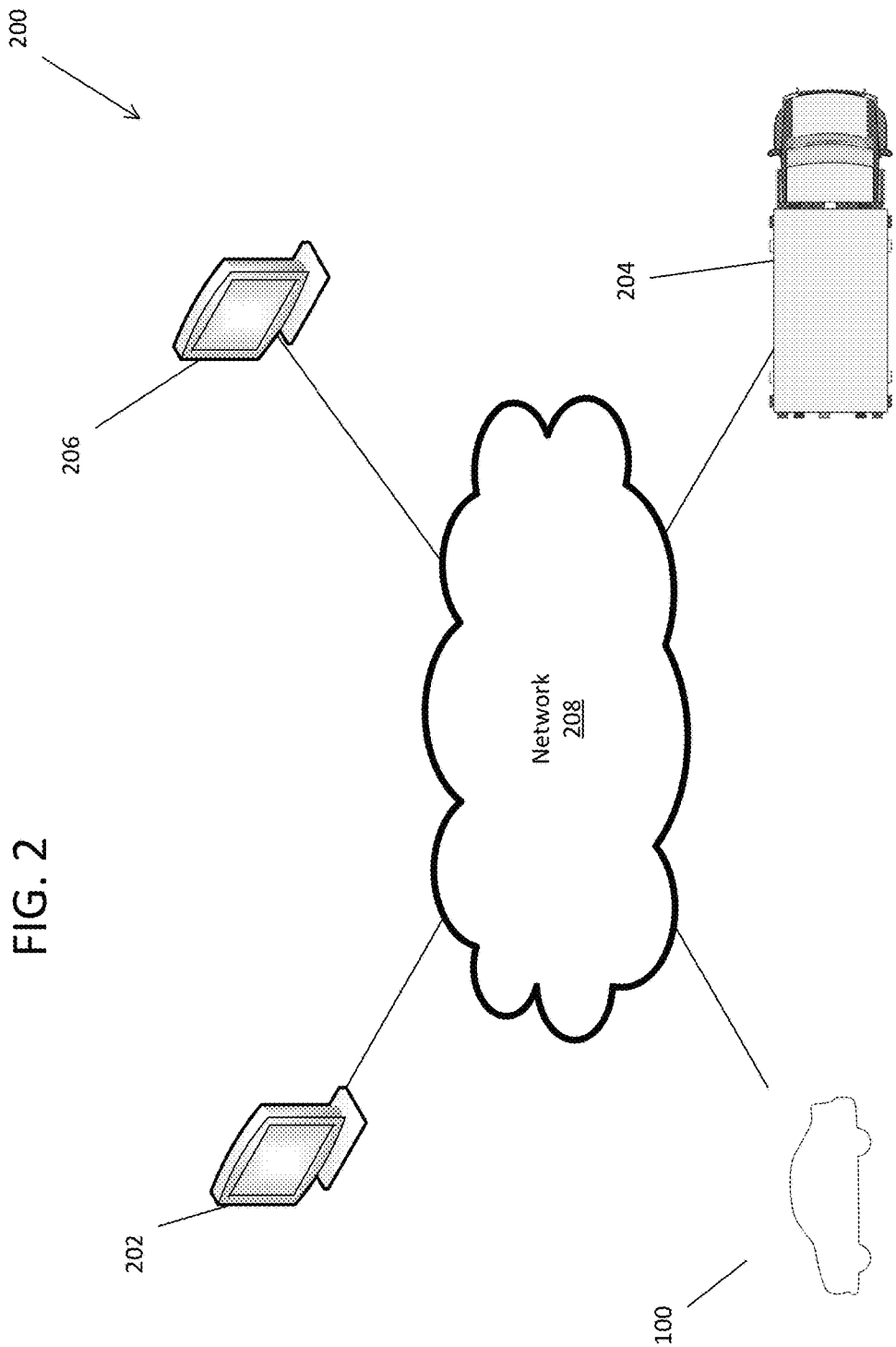
FIG. 2 depicts a system for controlling traffic using autonomous vehicles according to embodiments.

FIG. 2 depicts a system 200 for controlling traffic using autonomous vehicles, such as autonomous vehicle 100. System 200 may include a traffic control system 202. Traffic control system 202 may be configured to monitor real-time and historical traffic around an area, such as a municipal area. Traffic control system 202 may also be configured to relay information, such as route information, current speeds, current headings, and/or average speeds, from one or more prioritized vehicles 204 to autonomous vehicles 100. In some embodiments, the traffic control system 202 may also be configured to coordinate traffic control efforts of autonomous vehicles 100, such as by issuing command signals that cause one or more autonomous vehicles 100 to perform certain actions, such as start up, accelerate, brake, change direction, change routes, and/or other actions. In some embodiments, some or all of the autonomous vehicles may receive the same or different commands based on their location relative to a particular traffic event or condition. Traffic control system 202 may also be configured to receive data from other remote systems 206. For example, a school or event system, which may be operated by a private entity and/or a municipality, may provide information to the traffic control system 202 that allows the traffic control system 202 to adjust traffic flows and density to maximize traffic efficiency due to a particular event, such as a sporting event or school getting out. Other entities such as an air quality system and/or other remote system 206 may also be in communication with the traffic control set 202 to provide information to the traffic control system 202 for use in manipulating traffic patterns. In some embodiments, the prioritized vehicles 204, may be in direct communication with autonomous vehicles 100. This helps reduce communication time for alerting the autonomous vehicles 100 that a prioritized information is approaching. In such embodiments, the prioritized vehicles 204 may project a signal to all autonomous vehicles 100 within a particular radius of the prioritized vehicle 204 and/or along a route of the priority vehicle 204.

The various devices of system 200 may be in communication with one another via one or more networks 208. For example, network 208 may include one or more local area networks (LAN) and/or other wired and/or wireless networks. Network 208 may utilize one or more of Wi-Fi, ZigBee, Bluetooth™, Bluetooth™ Low Energy, a cellular communications protocol such as 3G, 4G, or LTE, and/or any other wireless communications protocol. It will be appreciated that one or more different network connections may be used in accordance with the invention, and that the use of a single network 208 to enable communications is merely one example of such configurations. For example, each component may be communicatively coupled with other components using a separate network for one or more of the connections. The connections between the autonomous vehicle 100, traffic control system 202, prioritized vehicles 204, and/or other remote sets 206 may be secure. This may be done using encryption over a public network, a private network, a secure virtual private network (VPN), or any other method of securing a connection.

In some embodiments, autonomous vehicles 100 may communicate with one another. This communication may be direct from one autonomous vehicle 100 to another autonomous vehicle 100, or may be done through a hub or central system that interfaces the autonomous vehicles 100 with one another. Intercommunication between a number of autonomous vehicles 100 allows the autonomous vehicles to inform each other of various traffic conditions, such as speeds and/or densities along a particular route, and may also allow autonomous vehicles 100 to provide one another with information such as braking data, that may be used to determine whether an adjustment of traffic conditions is necessary.

Figure 3:
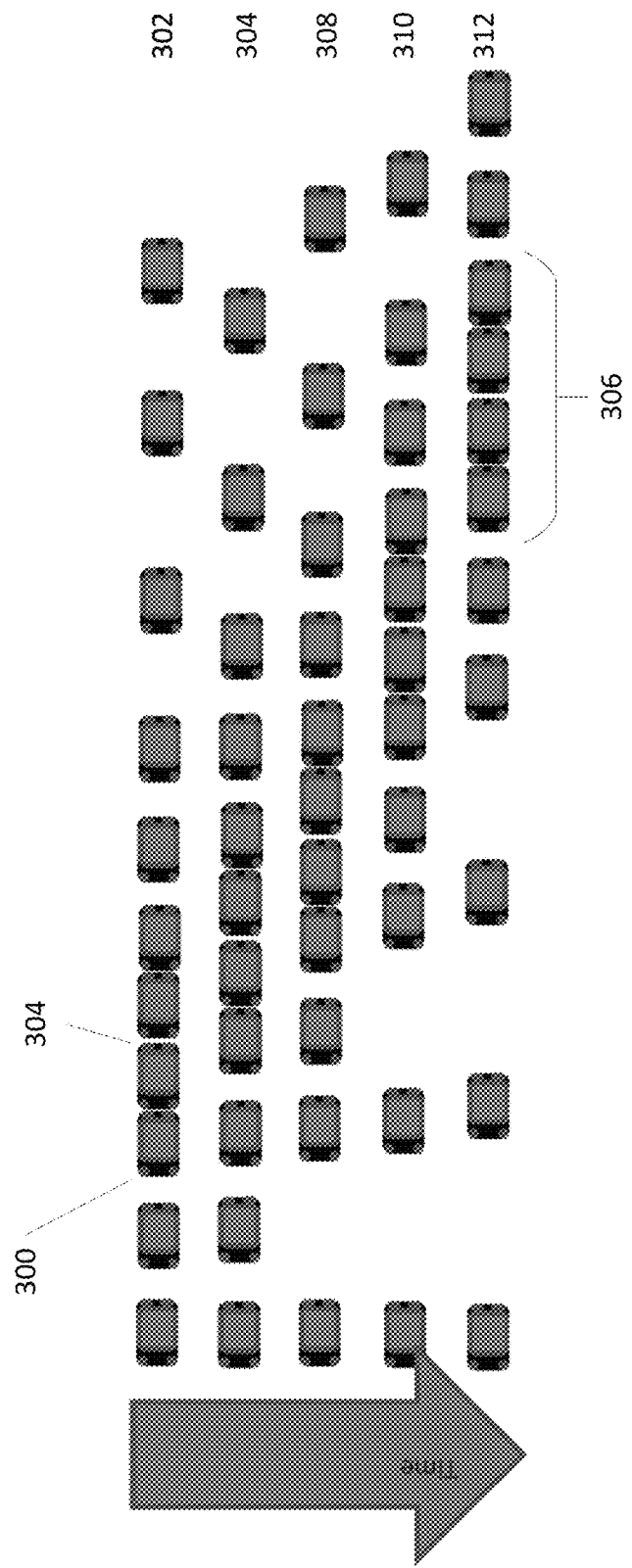
FIG. 3 depicts the propagation of a shockwave according to embodiments.

In other embodiments, autonomous vehicle 100 may be used to affect other traffic conditions. For example, traffic shockwave may be avoided and/or more quickly dissipated using one or more autonomous vehicles 100. FIG. 3 depicts the normal development of a shockwave in an area of high traffic density. As shown here, all cars are traveling forward from right to left. As one of the cars (here the third car 300 at time 302) approaches a car in front of it, car 300 must brake to slow down. As car 300 brakes, the car 304 following car 300 must also brake, however it is likely that the braking of the following car 304 will be slightly delayed due to the driver's reflexes taking a short period of time to kick in. This results in the following car 304 braking later getting closer to car 302. Subsequent cars have the same problem, which causes a high density area 306 that increases in size and/or propagates upstream of the first cars as shown at times 308, 310, 312, and 314.

Figure 4:
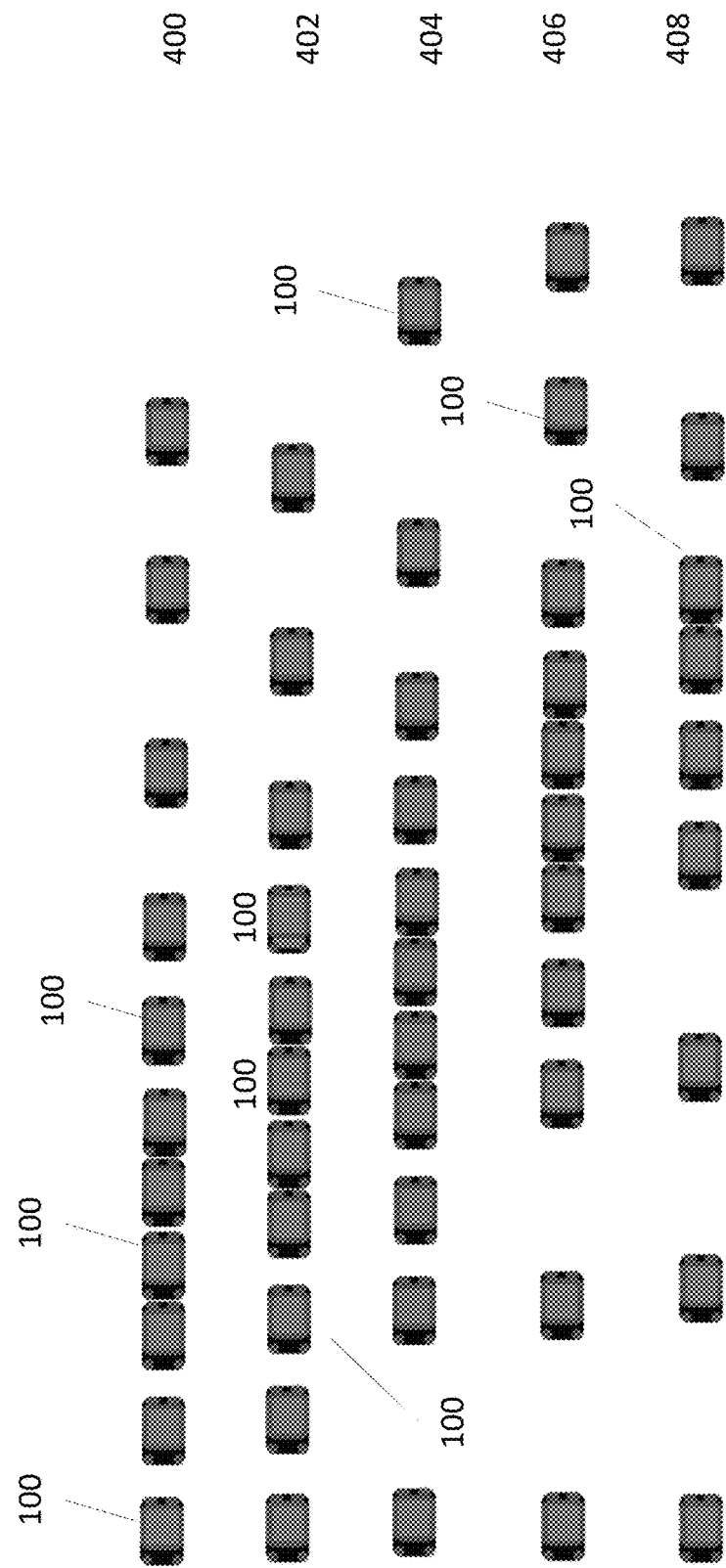
FIG. 4 is a demonstration of autonomous vehicles being used to dissipate a shockwave according to embodiments.

Autonomous vehicles 100 may be used to eliminate and/or reduce the effect of shockwave. FIG. 4 shows how one or more autonomous vehicles may be slowed to shrink the effect of a shockwave, thereby speeding up traffic and reducing and/or eliminating some forms of traffic jams. As shown here, one or more autonomous vehicles 100 may detect a pattern of braking and accelerating, such as when the autonomous vehicle 100 is in stop and go traffic as shown at time 400. Oftentimes, the shockwave will propagate on highways or other high speed roads. In some embodiments, the autonomous vehicles 100 may only detect shockwave on roads having speed limits over a certain velocity, such as 45 mph. When one autonomous vehicle 100 detects this pattern of braking and accelerating, the autonomous vehicle 100 may notify other autonomous vehicles 100 along the route and/or a traffic control system, such as traffic control system 202. The other autonomous vehicles 100 may confirm the pattern of braking and accelerating at time 402, either individually and/or by sending the data to the traffic control system, which may analyze data aggregated from a number of autonomous vehicles 100 along the particular route to determine that a shockwave is development or is already in existence. Once it is determined that a shockwave is developing or is present, one or more autonomous vehicles 100 upstream from the shockwave may gently and smoothly slow to a reduced speed as shown at times 404, 406, and 408. This forces cars behind the autonomous vehicle 100 to also slow smoothly as seen at time 406 and 408. By the time the autonomous vehicle 100 reaches the shockwave, the size of the shockwave is reduced and/or the shockwave is eliminated. Further autonomous vehicles 100 may repeat the pattern until the shockwave is eliminated.

Figure 5:
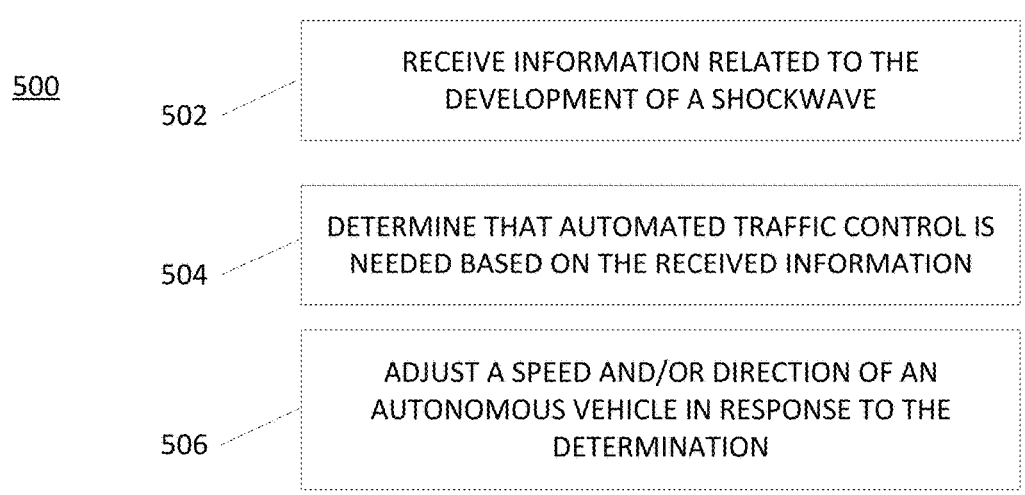
FIG. 5 is a flowchart depicting a process for controlling a shockwave using
Autonomous vehicles according to embodiments.

FIG. 5 depicts a process 500 for minimizing the effect of a shockwave using autonomous vehicles. Process 500 may utilize autonomous vehicle 100 and/or traffic control system 202. Process 500 may begin at block 502 by receiving information related to a traffic condition, namely the development and/or existence of a shockwave. The information may include a location of the shockwave. The information may be provided by one or more autonomous vehicles, such as autonomous vehicle 100. For example, one or more autonomous vehicles may detect a pattern of braking and acceleration that is consistent with the propagation of a shockwave. The braking and acceleration may be detected using one or more of accelerometers, speed monitors, braking monitors, and/or other sensors of the autonomous vehicles. In some embodiments, this data may be communicated to the traffic control system at all times, while in other embodiments, the autonomous vehicles only communicate this data when the autonomous vehicles determine that a shockwave is likely formed or forming. The traffic control system may determine that automated traffic control is needed based on the received information at block 504. The traffic control system may then identify one or more autonomous vehicles that are upstream of the shockwave. At block 506, the traffic control system may adjust a speed and/or a direction of at least one of the autonomous vehicles based on the determination that automated traffic control is necessary. For example, the traffic control system may send a command to one or more of the autonomous vehicles upstream from the shockwave that causes the autonomous vehicles to slow to a reduced rate of speed. This reduced rate of speed may be calculated based on a variety of factors. For example, the rate of speed may be based on a current rate of speed of each autonomous vehicle, a distance between the a rear of the shockwave and each autonomous vehicle, a size of the shockwave, a density of traffic along the route, and/or a design of the roadway along the route. These factors may be measured and/or calculated by each autonomous vehicle and/or the traffic control system.

In some embodiments, the speed of the autonomous vehicles is reduced to a constant rate such that a gap in traffic is maintained between a rear of the traffic shockwave and a forwardmost of the plurality of autonomous vehicles until the traffic shockwave is dissipated. The gap may be as small as one car length and/or as long as several tenths of a mile. In some embodiments, the desired rate of speed is a constant speed selected such that the at least one autonomous vehicle can travel without reaching the traffic shockwave and without coming to a stop prior to dissipation of the traffic shockwave. In other embodiments, the desired rate of speed is a constant speed selected such that each of the at least one autonomous vehicle can travel without reaching the traffic shockwave and without falling below a threshold velocity. For example, the threshold velocity may be between about 0-10 mph, although higher speeds may be possible. In some embodiments, the speed adjustments may be communicated to a guided active cruise control system of the autonomous vehicles that allows the autonomous vehicle to maintain the commanded speed any time that road conditions allow, but allows the autonomous vehicle to slow down if traffic necessitates further braking. Once conditions recover, the autonomous vehicle may accelerate back to the desired speed. In some embodiments, information about the shockwave may be updated based on newly received data from one or more autonomous vehicles regarding speeds, braking and acceleration patterns, and/or other traffic data. This updated data may be used to make further adjustments to the speed and/or direction of the Autonomous vehicles along the route.

In other embodiments, the traffic control system may determine that one lane of a multiple lane highway has no available autonomous vehicles, while another lane may have multiple autonomous vehicles available. The traffic control system may then send a command that instructs one or more of the autonomous vehicles in a lane with multiple autonomous vehicles to change lanes and reduce its speed such that the autonomous vehicles can work together to adjust the speed of traffic in all lanes.

In some embodiments, the traffic control system may determine that additional autonomous vehicles are needed to help reduce the effects of the shockwave. In such embodiments, the traffic control system may identify one or more autonomous vehicles that are on nearby routes and/or are parked nearby. The traffic control system may then send commands to the identified autonomous vehicles to move onto the particular route to help gradually slow traffic behind the shockwave. This is done in a similar manner as current law enforcement vehicles that are used to create a rolling roadblock, but has the advantage of not requiring law enforcement personnel to devote time to such efforts. In fact, unoccupied autonomous vehicles may be used to perform such tasks. For example, the traffic control system may send a wakeup command to one or more autonomous vehicles that are unoccupied and powered off. The wakeup command may activate an ignition mechanism of the autonomous vehicles to turn them on such that they may be moved into a roadway using remote guidance commands that operate with the location modules of each autonomous vehicle to allow the autonomous vehicles to go into a self-driving mode.

While described with a traffic control system coordinating the efforts of reducing the effects of a shockwave, it will be appreciated that in some embodiments, the autonomous vehicles may communicate directly with one another to manipulate the traffic and reduce and/or eliminate the effects of a shockwave. For example, when one or more autonomous vehicles detect a pattern of braking and accelerating that is consistent with the development of a shockwave, the autonomous vehicles may communicate this data to other nearby autonomous vehicles for confirmation that a shockwave is developing. Upon confirmation of the shockwave, one or more autonomous vehicles upstream from the shockwave may reduce their speeds accordingly to prevent the autonomous vehicles (and trailing vehicles) from reaching the shockwave.

Figure 6:
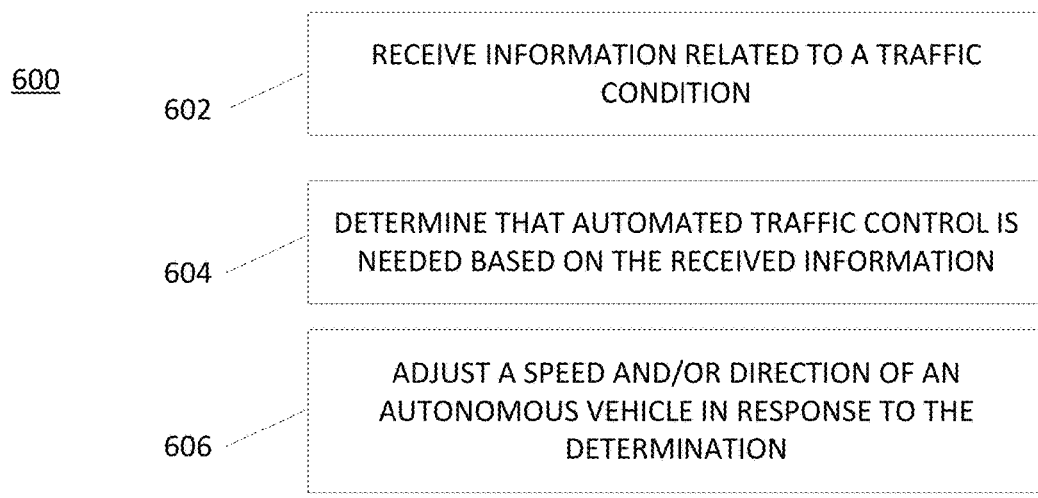
FIG. 6 is a flowchart depicting a process for controlling traffic using Autonomous vehicles according to embodiments.

It will be appreciated that autonomous vehicles 100 may be used to control traffic in situations unrelated to shockwave. For example, FIG. 6 depicts a process for generally controlling traffic using autonomous vehicles. Process 600 may utilize autonomous vehicle 100, traffic control system 202, and/or remote systems 206. Process 600 may begin at block 602 by receiving information related to a traffic condition. The information may include a location of the traffic information and an indication of the type of traffic condition present. The location of the traffic condition may include a specific location, such as an address, intersection, coordinates, and/or other location identifying data. In other embodiments, the location may include a radius or other description of an area at issue. The traffic condition may be related to any number of events, phenomena, and/or conditions with some association with traffic. For example, a type of the traffic condition may include traffic density issues, air quality issues, detours, events, and/or other conditions related to traffic. Information about these issues may be provided to a traffic control system by one or more remote systems. For example, an air quality system, a construction entity, and/or other municipal and/or private entity may provide information to the traffic control center. The information may include a request to adjust traffic patterns to help ease and/or eliminate the traffic condition. The traffic control system may then use the information to determine a best course of action. In some embodiments, the request to adjust traffic patterns may include a recommended course of action.

At block 604, a determination is made that automated traffic control is needed based on the received information. The automated traffic control may be part of the course of action, which may result in a speed and/or a direction of at least one autonomous vehicle being adjusted based on the determination at block 606. Each type of traffic condition may be associated with a particular adjustment of the autonomous vehicle. For example, the traffic condition may include a need to create a detour. This may be due to roadwork, an emergency on a particular roadway, a large event coming up and/or getting out (like a sporting event or a school letting out), and/or other reasons when a particular route needs to be avoided for a period of time. In such a case, one or more autonomous vehicles in the area may be used to create a makeshift roadblock. To do so, one or more autonomous vehicles may be maneuvered into a position to block at least a portion of a particular traffic route. In another embodiment, the traffic condition may relate to the enforcement of a speed limit. The speed limit may be an existing speed limit that is not being obeyed and/or may be a newly instituted speed limit, such as a temporary speed limit that is enforced in a construction zone, in a school zone, during congestion periods, and/or other speed limit. If a traffic control system determines that a speed limit needs help being enforced, one or more autonomous vehicles within the enforcement zone of the speed limit may be identified. One or more of these autonomous vehicles may be commanded to adjust its speed to match the desired speed limit. This will ensure that all vehicles behind the autonomous vehicles will be forced to eventually make corresponding adjustments in speed, eliminating speeding over a significant stretch of a roadway.

In other embodiments, the traffic condition may include a request to reduce pollution at a particular location, such as a school, park, or sporting field. The location may also include a radius or other area in which the air quality is to be increased. The traffic control system may then determine a current rate of speed and a traffic density for traffic within a predefined radius of the location. The traffic control system calculates a desired rate of speed based on factors such as the current rate of speed, the traffic density, a road design within the desired radius, and/or other factors. The rate of speed may be a constant velocity that is calculated to eliminate and/or minimize braking and acceleration of vehicles within the radius. One or more autonomous vehicles may have their speeds adjusted to the desired rate of speed. Cars behind the autonomous vehicles will make corresponding changes in speed and traffic will be able to move smoother, with little or no starting and stopping. This helps minimize the emissions of the vehicles within the predefined radius.

In yet other embodiments, the traffic condition may include traffic congestion along a particular traffic route. In some embodiments, the traffic control system may command one or more autonomous vehicles along the traffic route to change its path. For example, the autonomous vehicles may be commanded to turn off of the particular route and be rerouted using alternative roadways. This allows the traffic control system to reduce the number of vehicles on the congested path. In other embodiments, the traffic control set may determine a current rate of speed and a traffic density for traffic within a predefined radius of the location. This may be done using data acquired from a number of autonomous vehicles and/or using various traffic monitoring sensors. A desired rate of speed may be calculated based on factors such as the current rate of speed, the traffic density, a road design within the desired radius, and/or other factors. At least one autonomous vehicle may be commanded to speed or slow down to the desired rate of speed, which may be a constant velocity that is selected to minimize braking and acceleration within the predefined radius. By minimizing the braking and acceleration, traffic may be smoother and may move more efficiently as reaction time delays in braking and accelerating do not get an opportunity to compound, which could get magnified into shockwaves and/or other traffic jams, as discussed above.

It will be appreciated that the scenarios provided above are merely examples of possible actions performed in response to traffic conditions. Traffic control centers may determine their own solutions for handling various traffic conditions.

In some embodiments, the determinations may be made by a traffic control system, such as traffic control system 202, while in other embodiments, the autonomous vehicles themselves may make the determination that action is needed and what kind of action to perform. The traffic control system and/or the autonomous vehicles may be in communication with one another and/or remote sources, such as event centers, school systems, air quality control systems, and the like. The traffic control systems and/or the autonomous vehicles may use information acquired from theses remote sources to make the determinations on when and how to respond to control traffic to achieve a desired result.

In some embodiments, the traffic control system may determine that additional autonomous vehicles are needed to help control traffic. In such embodiments, the traffic control system may identify one or more autonomous vehicles that are on nearby routes and/or are parked nearby relative to the location of the traffic condition. The traffic control system may then send commands to the identified autonomous vehicles to move onto the particular route to help control traffic. In fact, unoccupied autonomous vehicles may be used to perform such tasks. For example, the traffic control system may send a wakeup command to one or more autonomous vehicles that are unoccupied and powered off. The wakeup command may activate an ignition mechanism of the autonomous vehicles to turn them on such that they may be moved into a roadway using remote guidance commands that operate with the location modules of each autonomous vehicle to allow the autonomous vehicles to go into a self-driving mode.

Figure 7:
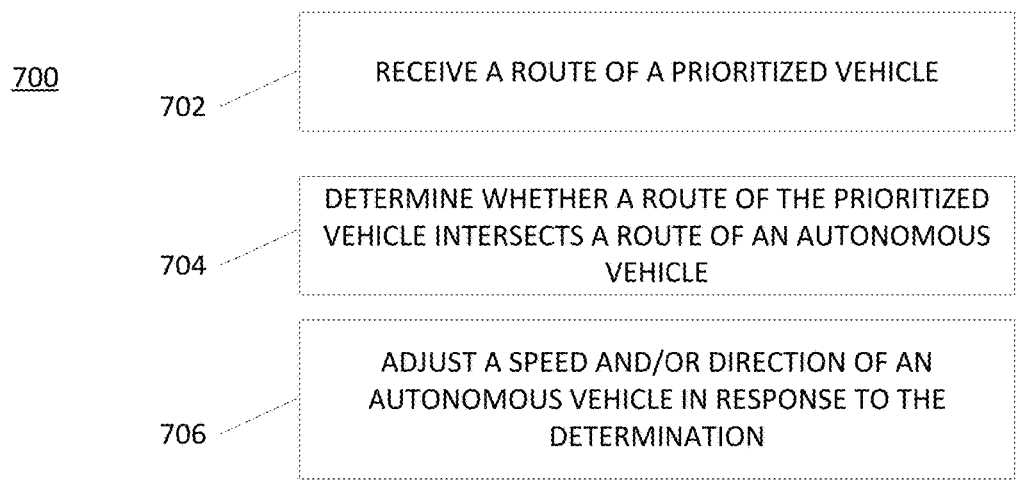
FIG. 7 is a flowchart depicting a process for controlling traffic using Autonomous vehicles according to embodiments.

FIG. 7 depicts a process 700 for controlling traffic using autonomous vehicles. Process 700 may be performed by an autonomous vehicle, such as autonomous vehicle 100, and may involve interactions with traffic control systems, remote systems, and/or prioritized vehicles. Process 700 may begin at block 702 by receiving, at the autonomous vehicle, a route of a prioritized vehicle. The route of the prioritized vehicle may include a current location of the prioritized vehicle, a current heading of the prioritized vehicle, a current rate of speed of the prioritized vehicle, an average rate of speed of the prioritized vehicle, and/or an expected path of the prioritized vehicle. In some embodiments, the route may be received from a traffic control system, such as a system operated by a municipality. In other embodiments, a prioritized vehicle system and/or the prioritized vehicle itself may provide the information to the autonomous vehicle. In some embodiments, the autonomous vehicle is selected to receive the route of the prioritized vehicle based on the autonomous vehicle being within a predefined radius of the route of the prioritized vehicle, the autonomous vehicle being parked, and/or the autonomous vehicle being unoccupied. The autonomous vehicle may also be selected based on a type of vehicle it is. For example, each autonomous vehicle may include an identifier that indicates whether the autonomous vehicle is a private or publicly owned vehicle. The identifier may also indicate a type of vehicle (e.g., passenger, construction, delivery, rideshare/shuttle, police, etc.). In some embodiments, the identifier may be associated with a particular owner or car, while in other embodiments, the identifier may allow the owner to remain anonymous. For example, the identifier may be randomly assigned and/or based on a location of the autonomous vehicle, such as based on GPS coordinates of the vehicle. Thus, in some embodiments, the identifier may vary over time. The identifier allows a traffic control system to have a unique handle for identifying autonomous vehicles may serve as addresses for directing communications, such as commands and data exchanges, to specific autonomous vehicles.

At block 704 the autonomous vehicle may determine whether a route of the autonomous vehicle intersects the route of the prioritized vehicle. An intersection may occur if the path of the autonomous vehicle will or is expected to cross and/or overlap a route of the prioritized vehicle. In some embodiments, the autonomous vehicle may receive traffic information related to traffic within a predefined radius of the intersection from a traffic control system. The traffic information may include an average speed of traffic, a traffic density, and/or other information related to current and/or historic traffic. The autonomous vehicle may then determine one or both of a time or a distance remaining to the intersection (and whether or not the intersection exists) based at least in part on the traffic information. A traffic control action may be determined based at least in part on the one or both of the time or the distance remaining to the intersection. While this determination is often performed by the autonomous vehicle itself, in some embodiments, a traffic control system may make the determination and send a command to the autonomous vehicle instructing the autonomous vehicle to perform a desired function. A direction and/or a speed of the autonomous vehicle may be adjusted based on the determination at block 706. For example, if the autonomous vehicle is expected to cross the path of the prioritized vehicle, the autonomous vehicle may determine that it should slow down. This allows the prioritized vehicle to pass the intersection before the autonomous vehicle (and cars behind the autonomous vehicle) crosses its path.

In some embodiments, route information of the prioritized vehicle and/or the autonomous vehicle may be updated. For example, route information may be continuously updated in real-time, may be updated at predetermined intervals, and/or be updated when a deviation in the path of the automated vehicle and/or the prioritized vehicle is detected. This information may be used by the autonomous vehicle and/or a traffic control system to readjust the speed and/or direction of the autonomous vehicle to further avoid the path of the prioritized vehicle.

In some embodiments, not enough (or no) autonomous vehicles may be on the road to control traffic along a path of a prioritized vehicle. In such cases, the traffic control system may identify one or more parked and/or inactive autonomous vehicles near the path of the prioritized vehicle. The traffic control center may send a wakeup command to one or more of the inactive autonomous vehicles (that may or may not include the route information). This wakeup command may cause an ignition mechanism of the Autonomous vehicles to activate, allowing the autonomous vehicle to move or be moved into traffic in accordance with a traffic control decision.

Figure 8:
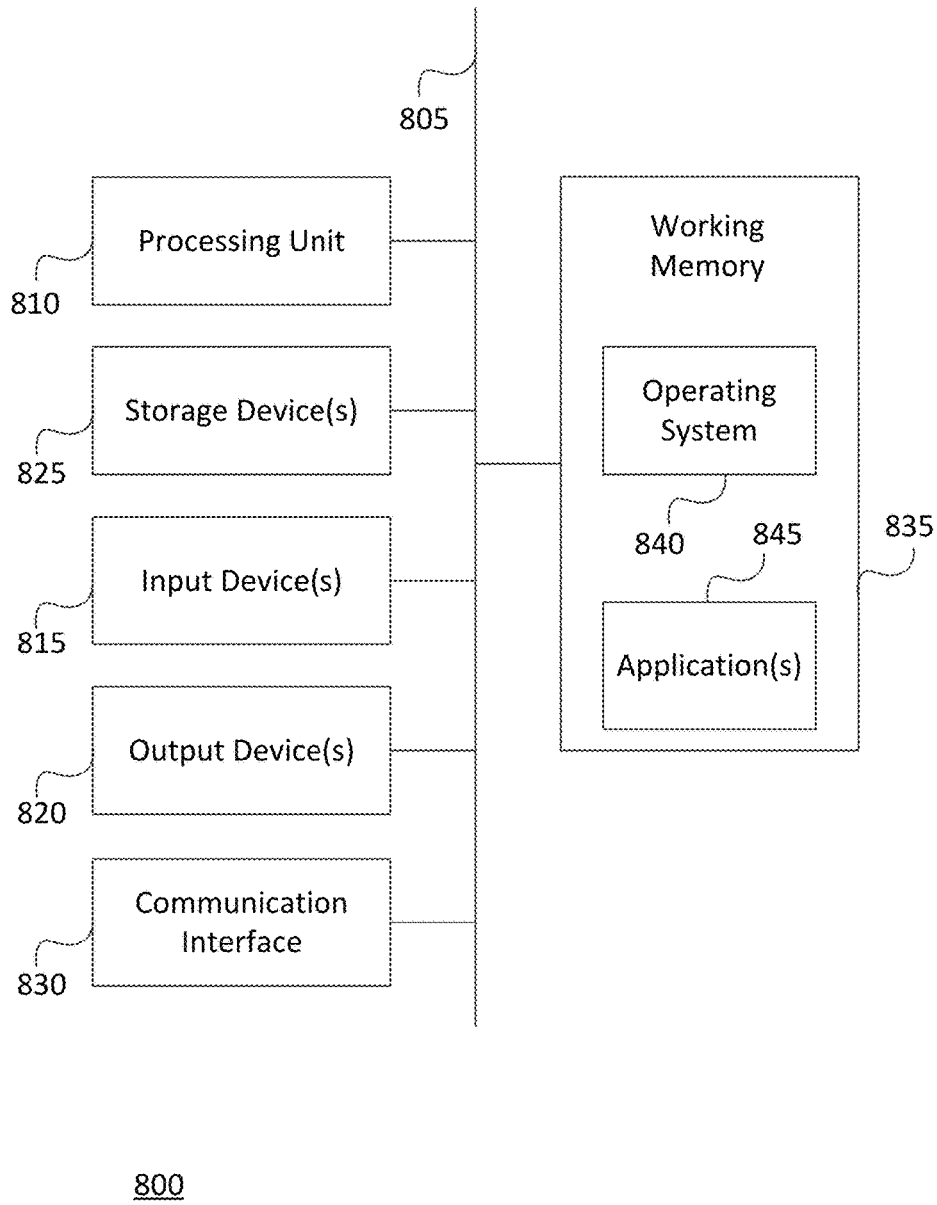
FIG. 8 is a block diagram of an example computing system according to embodiments.

A computer system as illustrated in FIG. 8 may be incorporated as part of the previously described computerized devices. For example, computer system 800 can represent some of the components of the autonomous vehicle 100, traffic control system 202, prioritized vehicle 204, remote systems 206, and the like described herein. FIG. 8 provides a schematic illustration of one embodiment of a computer system 800 that can perform the methods provided by various other embodiments, as described herein. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include a processing unit 810, including without limitation one or more processors, such as one or more special-purpose processors (such as digital signal processing chips, graphics acceleration processors, and/or the like); one or more input devices 815, which can include without limitation a keyboard, a touchscreen, receiver, a motion sensor, a camera, a smartcard reader, a contactless media reader, and/or the like; and one or more output devices 820, which can include without limitation a display device, a speaker, a printer, a writing module, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communication interface 830, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 830 may permit data to be exchanged with a network (such as the network described below, to name one example), other computer systems, and/or any other devices described herein. In many embodiments, the computer system 800 will further comprise a non-transitory working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 810, applications 845, etc.) Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processing unit 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processing unit 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processing unit 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire, and fiber optics, including the wires that comprise the bus 805, as well as the various components of the communication interface 830 (and/or the media by which the communication interface 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a non-transitory storage device 825 either before or after execution by the processing unit 810.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An autonomous vehicle, comprising:
   a vehicle body;
   a drive mechanism configured to propel the vehicle body;
   a location module;
   a communication interface in communication with a traffic control system;
   a processing unit in communication with the drive mechanism, the location module, and the communication interface, the processing unit configured to:
   receive, via the communication interface, a route of a prioritized vehicle while the autonomous vehicle is parked and powered down based on a determination that a parked vehicle is needed to slow traffic;
   receive, via the communication interface, an activation command;
   activate, in response to the received activation command, an ignition mechanism of the autonomous vehicle to activate the drive mechanism;
   move, using the drive mechanism, the autonomous vehicle onto a roadway based on receiving the route of the prioritized vehicle;
   determine, in conjunction with the location module, that a route of the autonomous vehicle intersects the route of the prioritized vehicle; and
   adjust, using the drive mechanism, a speed of the autonomous vehicle to slow traffic behind the autonomous vehicle along the route of the autonomous vehicle based on the determination.

2. The autonomous vehicle of claim 1, wherein:
   the location module comprises a global positioning satellite system.

3. The autonomous vehicle of claim 1, wherein:
   the drive mechanism comprises one or more of an engine, a motor, and a steering mechanism.

4. The autonomous vehicle of claim 1, wherein:
   the ignition mechanism is coupled with the processing unit, the ignition mechanism being configured to activate one or both of an engine or a motor of the drive mechanism.

5. The autonomous vehicle of claim 1, wherein:
   at least a portion of the communication interface is powered on at all times such that the route of the prioritized vehicle is receivable when the autonomous vehicle is powered off.

6. The autonomous vehicle of claim 1, wherein the processing unit is further configured to:
   receive traffic information related to traffic within a predefined radius of the intersection;
   determine one or both of a time or a distance remaining to the intersection based at least in part on the traffic information; and
   identify a traffic control action based at least in part on the one or both of the time or the distance remaining to the intersection, wherein adjusting one or more of the direction or the speed of the autonomous vehicle is further based on the traffic control action.

7. A method for manipulating traffic using an autonomous vehicle, the method comprising:
   receiving, at the autonomous vehicle, a route of a prioritized vehicle while the autonomous vehicle is parked and powered down based on a determination that a parked vehicle is needed to slow traffic;
   receiving, at the autonomous vehicle, an activation command;
   activating, in response to the received activation command, an ignition mechanism of the autonomous vehicle to activate a drive mechanism of the autonomous vehicle;
   moving, using the drive mechanism, the autonomous vehicle onto a roadway based on receiving the route of the prioritized vehicle;
   determining by the autonomous vehicle that a route of the autonomous vehicle intersects the route of the prioritized vehicle; and
   adjusting a speed of the autonomous vehicle to slow traffic behind the autonomous vehicle along the route of the autonomous vehicle based on the determination.

8. The method for manipulating traffic using an autonomous vehicle of claim 7, wherein:
   the route of the prioritized vehicle comprises one or more of a current location of the prioritized vehicle, a current heading of the prioritized vehicle, a current rate of speed of the prioritized vehicle, an average rate of speed of the prioritized vehicle, and an expected path of the prioritized vehicle.

9. The method for manipulating traffic using an autonomous vehicle of claim 7, further comprising:
   receiving traffic information within a predetermined radius of the intersection.

10. The method for manipulating traffic using an autonomous vehicle of claim 9, further comprising:
    determining one or both of a time or a direction remaining to the intersection based at least in part on the traffic information.

11. The method for manipulating traffic using an autonomous vehicle of claim 10, further comprising:
identifying a traffic control action based at least in part on the one or both of the time or the distance remaining to the intersection, wherein adjusting one or more of the direction or the speed of the autonomous vehicle is further based on the traffic control action.

12. A non-transitory computer-readable medium having instructions embedded thereon for manipulating traffic using an autonomous vehicle, the instructions comprising computer code for causing a computing device to:
receive, at an autonomous vehicle, a route of a prioritized vehicle while the autonomous vehicle is parked and powered down based on a determination that a parked vehicle is needed to slow traffic;
receive, at the autonomous vehicle, an activation command;
activate, in response to the received activation command, an ignition mechanism of the autonomous vehicle to activate a drive mechanism of the autonomous vehicle;
move, using the drive mechanism, the autonomous vehicle onto a roadway based on receiving the route of the prioritized vehicle;
determine by the autonomous vehicle that a route of the autonomous vehicle intersects the route of the prioritized vehicle; and
adjust a speed of the autonomous vehicle to slow traffic behind the autonomous vehicle along the route of the autonomous vehicle based on the determination.

13. The non-transitory computer-readable medium having instructions embedded thereon for manipulating traffic using an autonomous vehicle of claim 12, wherein:
the route of the prioritized vehicle is received from a municipal traffic control system.

14. The non-transitory computer-readable medium having instructions embedded thereon for manipulating traffic using an autonomous vehicle of claim 13, wherein:
the autonomous vehicle is selected to receive the route of the prioritized vehicle based on one or more of the autonomous vehicle being within a predefined radius of the route of the prioritized vehicle, the autonomous vehicle being parked, and the autonomous vehicle being unoccupied.

15. The non-transitory computer-readable medium having instructions embedded thereon for manipulating traffic using an autonomous vehicle of claim 12, further comprising instructions causing the computing device to:
receive updated route information associated with the prioritized vehicle after adjusting one or more of the speed or the direction; and
further adjust the one or more of the speed or the direction based on the updated route information.

16. The non-transitory computer-readable medium having instructions embedded thereon for manipulating traffic using an autonomous vehicle of claim 12, further comprising instructions causing the computing device to:
receive traffic information related to traffic within a predefined radius of the intersection; and
determine one or both of a time or a distance remaining to the intersection based at least in part on the traffic information.

17. The non-transitory computer-readable medium having instructions embedded thereon for manipulating traffic using an autonomous vehicle of claim 16, further comprising instructions causing the computing device to:
identify a traffic control action based at least in part on the one or both of the time or the distance remaining to the intersection, wherein adjusting one or more of the direction or the speed of the autonomous vehicle is further based on the traffic control action.

* * * * *